United States Patent
Heilig et al.

(10) Patent No.: US 10,740,290 B2
(45) Date of Patent: Aug. 11, 2020

(54) SYSTEMS AND METHODS FOR KEY-VALUE STORES

(71) Applicant: ET International, Inc., Newark, DE (US)

(72) Inventors: Brian E. Heilig, West Berlin, NJ (US); Guang R. Gao, Newark, DE (US); Brian Phillips, Newark, NJ (US); Adam Markey, Newark, NJ (US)

(73) Assignee: JETFLOW TECHNOLOGIES, Nanjing, Jiangsu Province (CN)

( * ) Notice: Subject to any disclaimer, the term of this patent is extended or adjusted under 35 U.S.C. 154(b) by 479 days.

(21) Appl. No.: 14/697,170

(22) Filed: Apr. 27, 2015

(65) Prior Publication Data
US 2016/0306817 A1 Oct. 20, 2016

Related U.S. Application Data

(60) Provisional application No. 62/147,384, filed on Apr. 14, 2015.

(51) Int. Cl.
| | |
|---|---|
| *G06F 7/00* | (2006.01) |
| *G06F 16/13* | (2019.01) |
| *G06F 16/182* | (2019.01) |
| *G06F 16/27* | (2019.01) |

(52) U.S. Cl.
CPC .......... *G06F 16/134* (2019.01); *G06F 16/182* (2019.01); *G06F 16/27* (2019.01)

(58) Field of Classification Search
CPC .............. G06F 17/30094; G06F 17/30194
USPC ......................................................... 707/827
See application file for complete search history.

(56) References Cited

U.S. PATENT DOCUMENTS

| | | | | |
|---|---|---|---|---|
| 9,497,039 B2* | 11/2016 | Greenberg | .......... | H04L 12/4633 707/707 |
| 9,633,051 B1* | 4/2017 | Maccanti | ............ | G06F 11/1451 707/707 |
| 2008/0270350 A1* | 10/2008 | Bojanic | ................ | G06F 16/254 707/707 |
| 2008/0270424 A1* | 10/2008 | Lee | ........................ | G06F 16/254 707/707 |
| 2013/0103729 A1* | 4/2013 | Cooney | ................ | G06F 16/188 707/831 |

(Continued)

FOREIGN PATENT DOCUMENTS

| CN | 103166785 A | 6/2013 |
|---|---|---|
| CN | 104156380 A | 11/2014 |

OTHER PUBLICATIONS

Hamr, "K-Cliques," published on Nov. 10, 2014 at http://www.hamrtech.com/assets/downloads/K-Cliques.pdf, pp. 1-4.*

(Continued)

*Primary Examiner* — Alexandria Y Bromell
(74) *Attorney, Agent, or Firm* — Ladas & Parry LLP

(57) ABSTRACT

Data storage in a distributed computing system may involve the implementation of key/value stores across multiple storage structures of the distributed computing system, where a key may represent an index and a value may represent an object to store and/or retrieve. A given key/value store may be accessed by multiple compute nodes of the distributed computing system. Duplication and/or versioning may be implemented in or across one or more of the key/value stores.

14 Claims, 5 Drawing Sheets

(56) References Cited

U.S. PATENT DOCUMENTS

| | | | | |
|---|---|---|---|---|
| 2013/0138646 A1* | 5/2013 | Sirer | .................. | G06F 16/27 |
| | | | | 707/736 |
| 2013/0226955 A1* | 8/2013 | Fang | .................. | H04L 67/2842 |
| | | | | 707/769 |
| 2013/0275656 A1* | 10/2013 | Talagala | .................. | G06F 3/0679 |
| | | | | 711/103 |
| 2014/0108489 A1 | 4/2014 | Glines et al. | | |
| 2014/0149355 A1* | 5/2014 | Gupta | .................. | G06F 11/1446 |
| | | | | 707/652 |
| 2015/0149870 A1* | 5/2015 | Kozat | .................. | H04L 1/0048 |
| | | | | 714/772 |

OTHER PUBLICATIONS

Int'l Search Report and Written Opinion dated Jul. 19, 2016 in Int'l Application No. PCT/CN2016/07912.

* cited by examiner

SYSTEMS AND METHODS FOR KEY-VALUE STORES

CROSS-REFERENCE TO RELATED APPLICATION

This application is a non-provisional application claiming priority to U.S. Provisional Patent Application No. 62/147,384, filed on Apr. 14, 2015, and incorporated herein by reference.

FIELD

Some aspects of this disclosure may relate to "big data" processing systems, and more specifically, to efficient storage techniques that may be used in implementations of such systems.

BACKGROUND

Data parallel application frameworks for large scale applications, such as Hadoop, Storm, and Spark, process a large volume of data by partitioning the data among the nodes in a compute cluster. These frameworks expose a functional model to the application developer and manage state information of the partitions internally. By exposing a functional model, the system can account for node failures while executing an application by moving partitions to a live node.

General programming models may generally account for two very broad but interrelated categories: data structures and algorithms. Data structures represent the model used to store and retrieve data, while algorithms represent the procedures that operate on data. In each of the previously-mentioned frameworks, the programming model exposes a rich interface for developing algorithms, but a very limited interface for exposing data structures.

Hadoop, for example, allows any general algorithm that operates on a key value pair, called a "map," or on a key and a list of values, called a "reduce." The implicit data structure in this model is commonly referred to as a "multimap." Spark limits the capabilities to transformations that take a list of key-value pairs and produce another list of key value pairs. Storm has no data storage capabilities at all.

What is lacking in each of these models is a general data structure, or set of data structures, that may be used for operations like random access, array lookup, list iteration, search, etc., but may expose an interface that hides partition state information so that the system can manage failures.

SUMMARY OF THE DISCLOSURE

Various aspects of the present application may include a shared-memory key/value pair data structure and storage system, referred to herein as "Key-Value Store (KVS)" and a method that may enable a KVS to be shared and parallel-processed efficiently and reliably in a large distributed processing environment.

A KVS or a system including a KVS, along with KVS-oriented methods, may be implemented in hardware and/or software and/or firmware. In a software embodiment, executable instructions may be contained on a machine-readable storage medium, such as, but not limited to, read-only memory (ROM), random-access memory (RAM), flash memory, magnetic or optical-based memory, etc.

BRIEF DESCRIPTION OF THE DRAWINGS

Various aspects of this disclosure will now be presented in detail, in conjunction with the attached drawings, in which.

DETAILED DESCRIPTION

Figure 1:
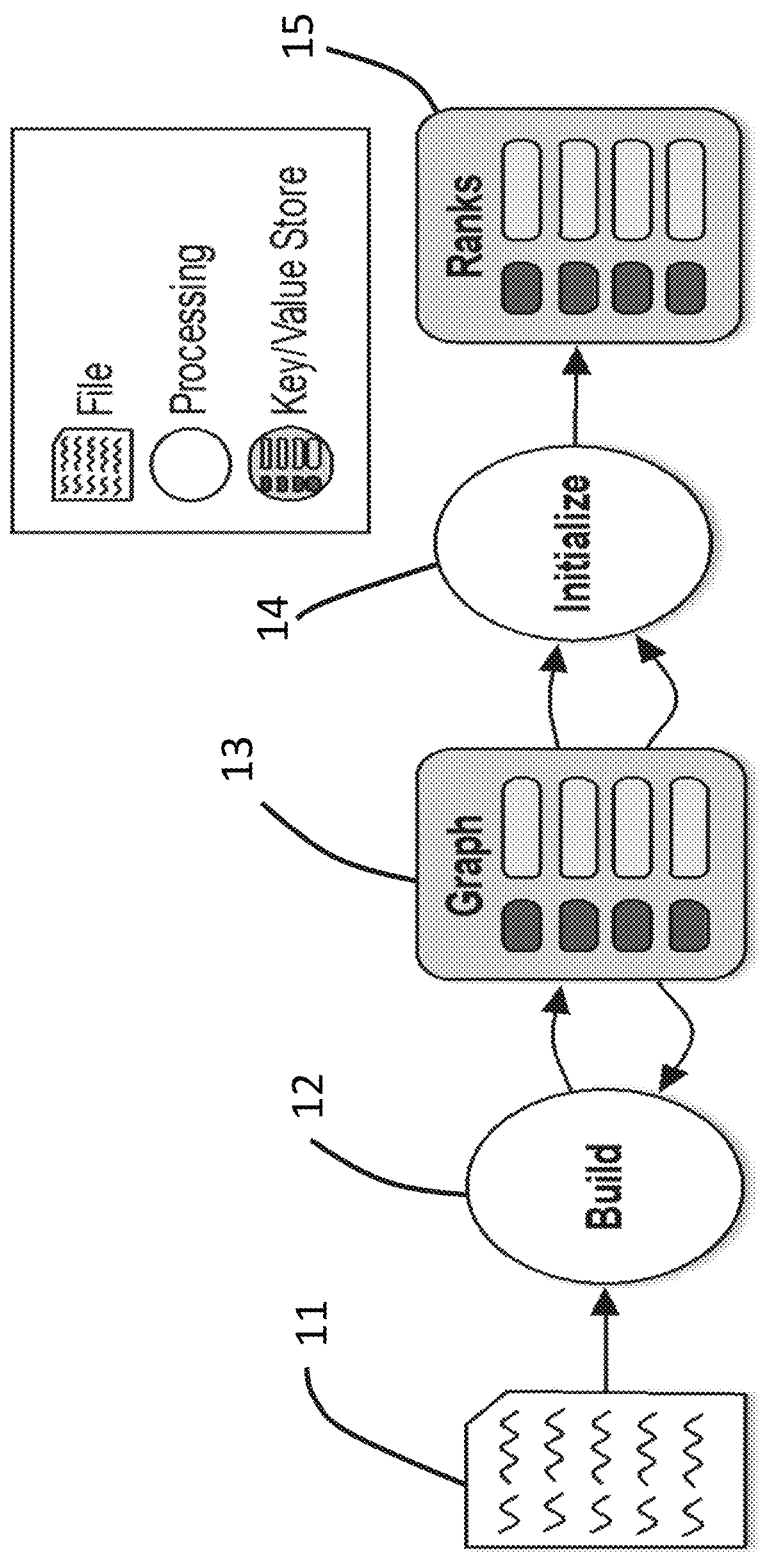
FIGS. 1 and 2 show initialization and execution of a process in a distributed processing system in which various aspects of the present disclosure may be employed.

To put various aspects of this disclosure into perspective, consider, for example, a naïve implementation of the Pagerank algorithm, e.g., as shown in FIG. 1. A file 11 may be read, where the file 11 may represent the pages and their links, e.g., one link per line of text. Pages and their links may be represented as integers. For example, "10 52" may be used to represent that page 10 has a link to page 52. The Build function 12 may take each link and may build an edge list. This edge list may be stored into a Graph data structure 13. Each key in the edge list may represent a single web page, and a corresponding value may represent a list of links to other web pages, or edges, in the graph. Once the graph is built, the Initialize function 14 may iterate over all of the keys (web pages). It may initialize a starting rank in the Ranks data structure 15 for each web page.

Figure 2:
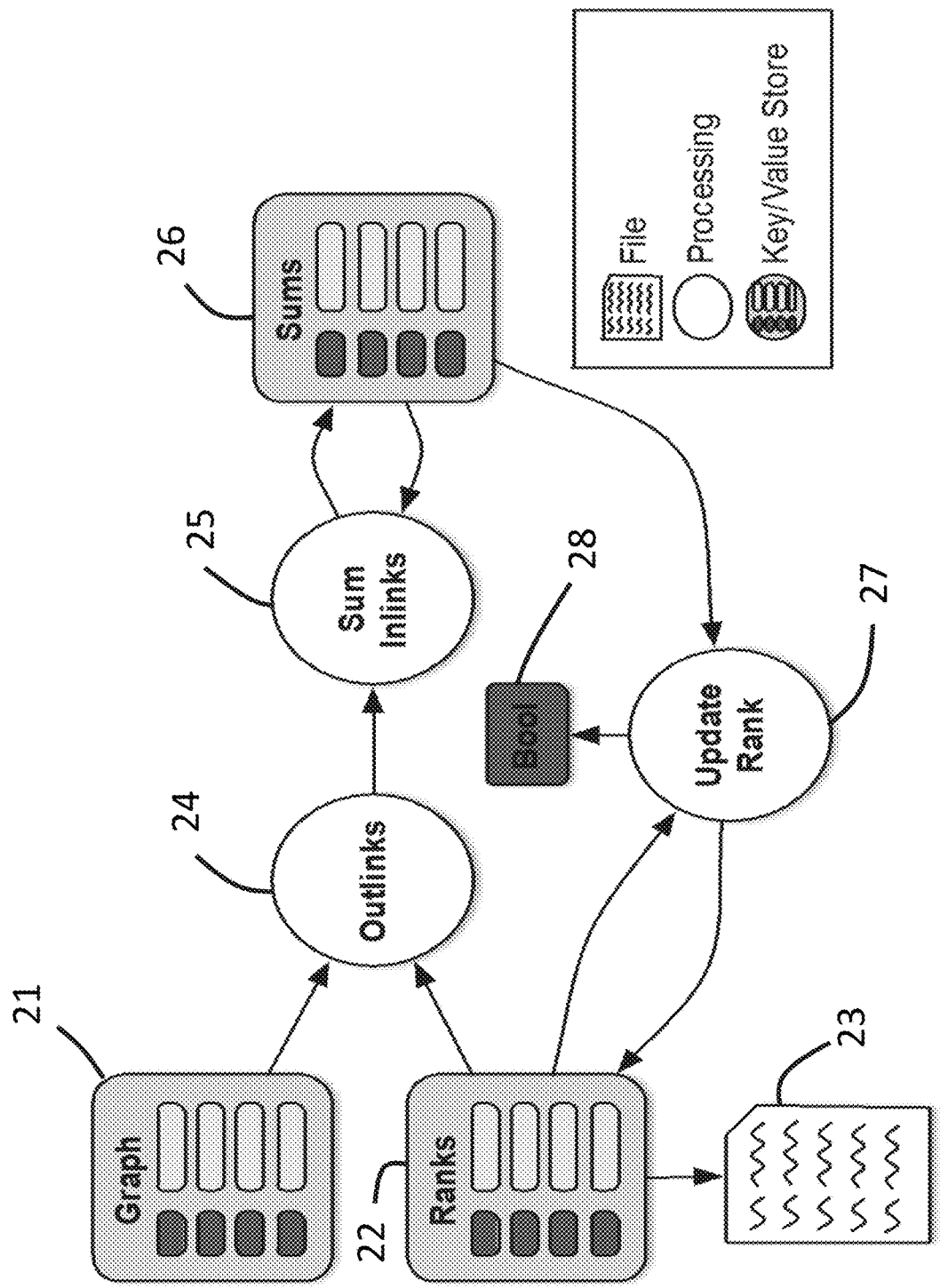

Next, an iteration phase may be executed. In the example shown in FIG. 2, the Graph 21 and Ranks 22 are the same data structures (13, 15) from the initialization phase, e.g., as in FIG. 1. The Outlinks function 24 may be used to iterate over the pages and their edge lists. It may receive a page and an edge list and may then get a current rank for that page. It may calculate a partial rank for a current web page and may then send that value to each page in the edge list. The Sum Inlinks function 25 may receive the new partial rank for each inlink to a given page and may sum the new partial ranks of the inlinks to the given page together. It may then store this sum in the Sums data structure 26. The Update Rank function 27 may receive the sum for each web page. It may perform a calculation on the sum and create an updated page rank for the web page. It may then store the new rank into the Ranks data structure 22. If the algorithm has converged, then it may set a Boolean value to true 28. If the algorithm has not converged, then the system may iterate again. Otherwise, the page ranks may be written to the output file 23 for each web page. This natural expression of the Pagerank algorithm may require access to data structures that support iteration, random access, read/write capability, etc.

Figure 3:
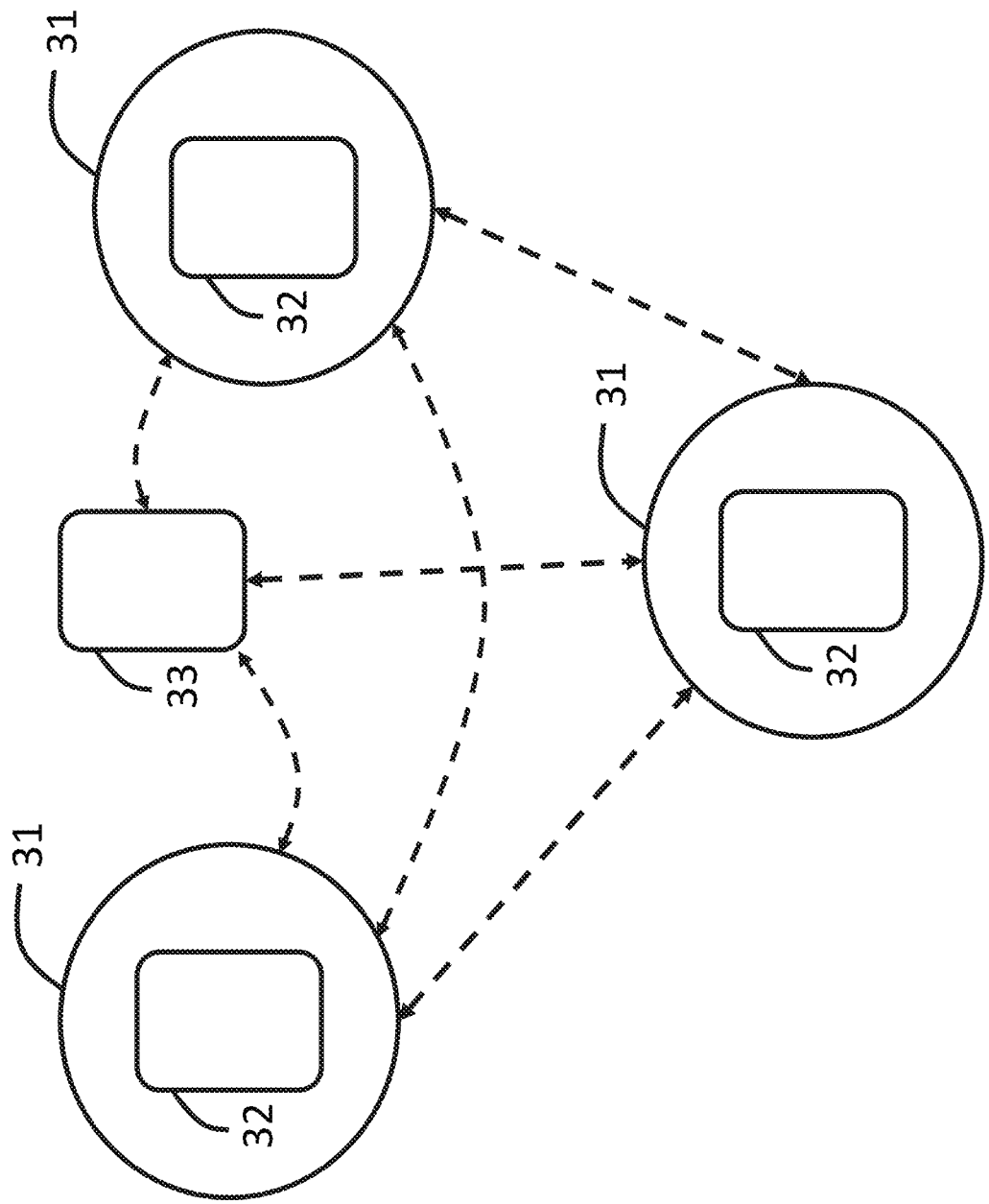
FIG. 3 shows an example implementation of an aspect of this disclosure.

A KVS is a type of data structure that may exist across multiple compute nodes, but may be treated as a single data structure. FIG. 3 shows an example of multiple compute nodes 31 and memory structures 32, 33 (i.e., physical memory structures, as opposed to a "data structure," which may be implemented in one or more physical memory structures), on which one or more KVSs may be implemented. The compute nodes 31 are not shown in any particular arrangement for executing any particular process/algorithm, so their arrangement/order is not limited to what is shown in FIG. 3. Similarly, connections are shown among all nodes/memory structures, but such connections are shown in dotted lines to indicate that the various connections may or may not exist in any particular implementation. Memory structures 32 are shown as being associated with compute nodes 31, while memory structure 33 is shown as not being associated with any particular compute node (e.g., a standalone memory structure). If a KVS is implemented across memory structures 32, 33 and is accessible by all of nodes 31, then nodes 31 may have read and/or write access to data stored in the various portions of the KVS in one or more of the memory structures 32, 33. Alternatively, node access may be limited to read access to some portions of the KVS and write access to other portions of the KVS (or both or neither, to some portions of the KVS). This will be discussed further below, as various KVS implementations are presented.

Read and write access to the KVS may be based on key/value pairs, where the key represents an index, and the value represents an object to store or retrieve. Each KVS may fall under one of three categories:

1. Distributed. The KVS may be partitioned among the nodes, and each node may own a unique subset of the key space. Nodes may only access the keys that are assigned to them. Attempts to access keys that are assigned to a different partition may result in undefined behavior.
2. Replicated. The KVS may be replicated across all nodes. Each node may then read the entire key space, but write access may be partitioned to a subset of the key space. Writing to a particular key may then cause the value to be replicated to all nodes.
3. Shared. The KVS may be readable and writable by all nodes, but the physical memory for storing the values may be partitioned among the nodes. Write operations may be restricted to purely commutative and associative operations, such as sum all. Reading a value for a key from a node that does not own the partition may cause the value to be obtained via a network operation.

Within these three categories there are several KVSs that may be implemented. Examples include, but are not limited to, hash tables, distributed arrays, multimap, and trees.

The concept of KVSs may be used in combination with flowlet-based processing, described in U.S. patent application Ser. No. 14/054,112, filed on Oct. 15, 2013, published as U.S. Patent Application Publication No. 2014/0108489, and incorporated by reference herein. Flowlets are data flow actors. Flowlets and KVSs may be connected in a directed graph, which may be a directed acyclic graph. Connections may indicate whether a particular flowlet can read from or read from and write to a KVS. Based on this graph, dependencies can be inferred, and barriers can be implicitly defined. These implicit barriers may allow the developer to access the KVSs from within the flowlet code without concern for the typical problems associated with parallel access to data structures.

Figure 4:
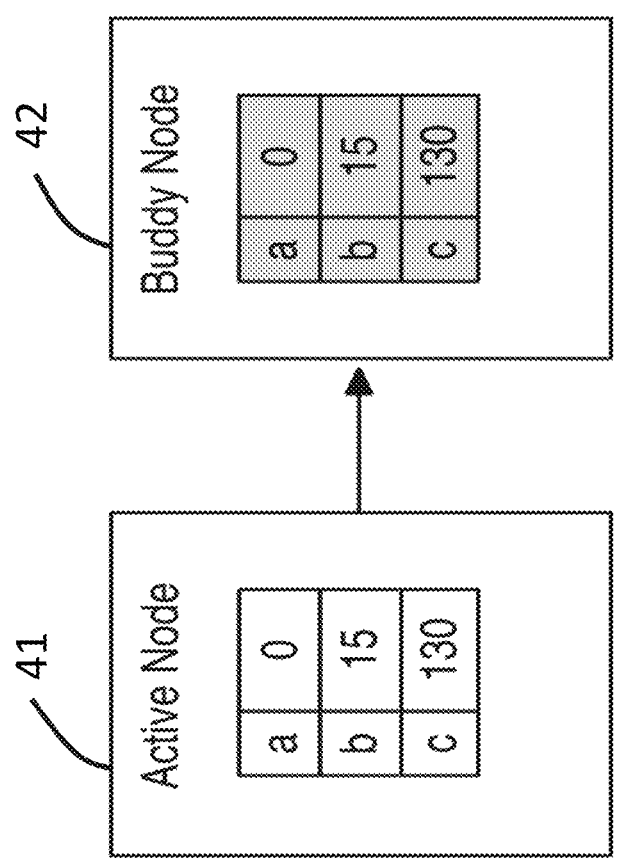
FIG. 4 shows a technique that may be used for reliability according to various aspects of this disclosure.

The KVS may also supports reliability across nodes by use of a buddy system, as shown in FIG. 4. Each partition of the KVS may be assigned to a primary node 41 and a secondary node (not shown). The primary node 41 may be where operations take place. The secondary node may receive a replica of the data, but may keep it serialized and compressed, since the secondary node may not require the system to access the KVS. In the event of a single node failure of the primary node 41, the system may promote the secondary node 42 to be the new primary node 41, choose a new secondary node 42, replicate the contents of the new primary node 41 to the new secondary node 42, and begin accessing the KVS using the new primary node 41.

KVSs may generally have a limited amount of system memory allocated to them. If the KVS grows too large, the system may have several options for decreasing the memory utilization. Each option may trade memory usage for delay. In order of least delay/most memory usage first:
1. All keys and values may be stored as objects.
2. Keys and/or values may be serialized and stored in an array. This may reduce the object overhead. Reading from the KVS may require that the data be deserialized.
3. Compressing the serialized data. Reading from the KVS may require that the data be decompressed and deserialized.
4. Spilling the compressed and serialized data to disk. Reading from the KVS may require that the data be read from disk, decompressed, and deserialized.

In each of these cases, the system may optimize access to the KVS by grouping access into large bins. A portion of the KVS can be read from disk, decompressed, and deserialized. This portion of the KVS may then be operated on by the system. Then this portion may be serialized, compressed, and written back to disk. Then, the next portion of the KVS may be operated on in the same manner.

Each KVS may also support versioning of its contents. Versioning of a KVS may be useful for cases where different parts of the system may operate on the KVS in different states. Parts of the system that are later in the computation might access a newer version of the KVS. This may be especially useful, for example, in algorithms that iterate over the data structure and where each iteration can overlap, that is, the second iteration may be executing in parallel with the first, etc.

Figure 5:
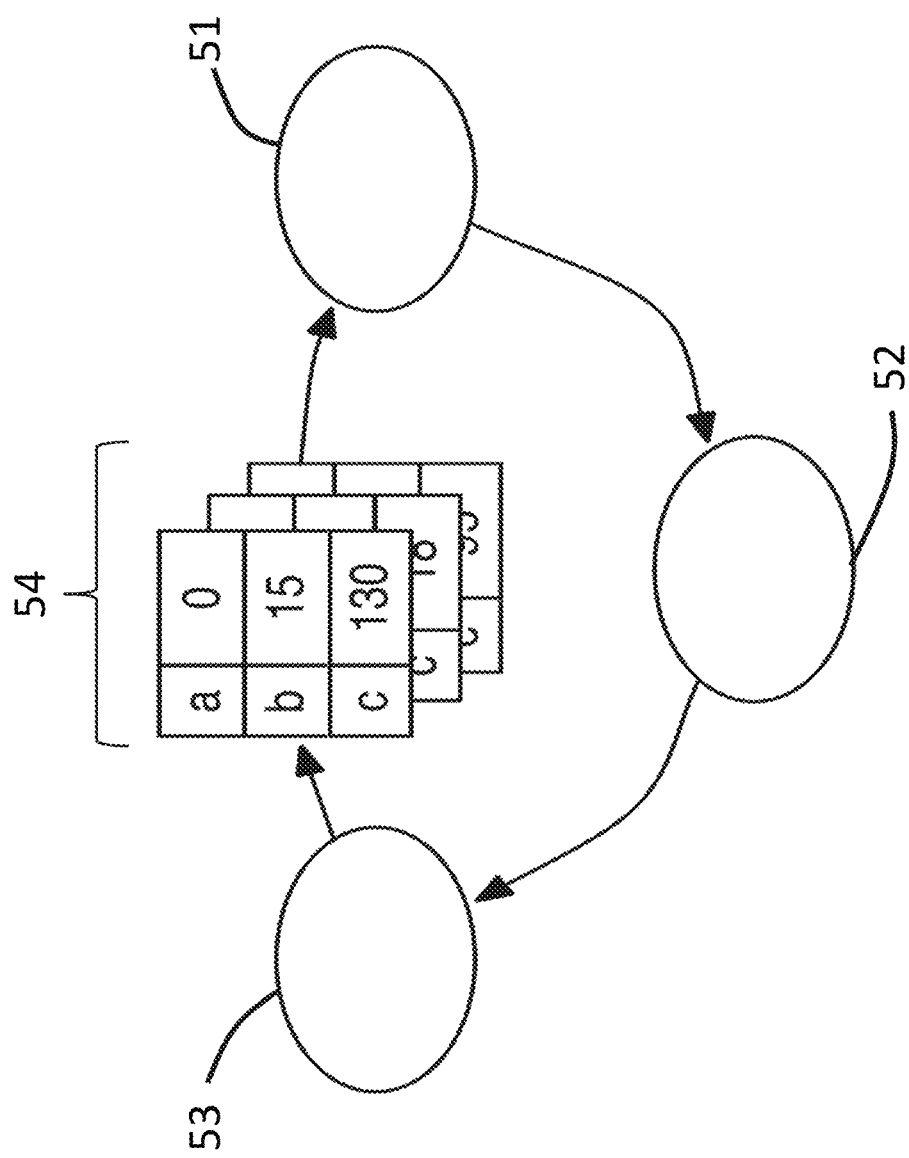
FIG. 5 shows an application according to an aspect of this disclosure.

FIG. 5 shows an example of such a situation. KVS 54 may include multiple versions of its contents, as shown, which may permit a first iteration of operations 51, 52, 53 to complete while a second iteration of operations 51, 52, 53 has already begun. For example, the second iteration may begin for a key for which the first iteration is complete, while the first iteration is continuing for one or more other keys; that is, the second iteration need not wait for the first iteration to complete for all keys. In this example, both iterations may see a consistent view of the KVS as they operate on different keys in parallel.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of storing data in a distributed processing system, the method including:
   implementing at least one key/value store across multiple storage structures of the distributed processing system;
   implementing a workflow over one or more compute nodes of the distributed processing system, wherein the implementing a workflow comprises instantiating one or more flowlets on the one or more compute nodes; and
   connecting the at least one key/value store to the one or more flowlets in a directed acyclic graph such that the connection indicates whether a particular flowlet of the one or more flowlets reads from, or reads from and writes to, the at least one key/value store, wherein each of the one or more flowlets comprises one or more user defined functions, wherein dependencies are inferred and barriers are defined based on the directed acyclic graph, wherein the barriers allow a developer to access the at least one key/value store from within flowlet code;

wherein the at least one key/value store is read-accessible, write-accessible, or read/write-accessible to at least one compute node of the distributed processing system;

wherein depending on an amount of memory available for the at least one key/value store, the distributed processing system is configured to perform at least one of the following functions:

(a) storing all keys and/or values as objects,
(b) serializing and storing at least a portion of the keys and/or values in an array to reduce object overhead,
(c) compressing at least a portion of serialized keys and/or values, and
(d) storing at least a portion of serialized and compressed keys and/or values to a disk, reading said at least a portion of serialized and compressed portions of the keys and/or values from the disk, and deserializing and decompressing the read portion from the disk.

2. The method of claim 1, further comprising storing data in the at least one key/value store using key/value pairs, wherein a key maps to a particular storage structure, and a value represents data.

3. The method of claim 2, further comprising duplicating data, wherein a key maps to one or more additional standby storage structures, a key/value pair being duplicated across one or more storage structures.

4. The method of claim 3, further comprising processing data using data stored on a particular standby storage structure for the remainder of a workflow in response to occurrence of a fault in a primary storage structure during execution of the workflow.

5. The method of claim 2, further comprising iteratively accessing and modifying the at least one key/value store.

6. The method of claim 5, further comprising independently accessing historical versions of the at least one key/value store.

7. The method of claim 1, further comprising accessing the at least one key/value store by at least one of the one or more flowlets.

8. A non-transitory machine-readable storage medium containing computer executable instructions which, when executed by at least one processor, cause the at least one processor to perform a method of storing data in a distributed processing system, the method including:

implementing at least one key/value store across multiple storage structures of the distributed processing system;

implementing a workflow over one or more compute nodes of the distributed processing system, wherein the implementing a workflow comprises instantiating one or more flowlets on the one or more compute nodes; and connecting the at least one key/value store to the one or more flowlets in a directed acyclic graph such that the connection indicates whether a particular flowlet of the one or more flowlets reads from, or reads from ad writes to, the at least one key/value store, wherein each of the one or more flowlets comprises one or more user defined functions, wherein dependencies are inferred and barriers are defined based on the directed acyclic graph, wherein the barriers allow a developer to access the at least one key/value store from within flowlet code;

wherein the at least one key/value store is read-accessible, write-accessible, or read/write-accessible to at least one compute node of the distributed processing system;

wherein depending on an amount of memory available for the at least one key/value store, the distributed processing system is configured to perform at least one of the following functions:

(a) storing all keys and/or values as objects,
(b) serializing and storing at least a portion of the keys and/or values in an array to reduce object overhead,
(c) compressing at least a portion of serialized keys and/or values, and storing at least a portion of serialized and compressed keys and/or values to a disk, reading said at least a portion of serialized and compressed portions of the keys and/or values from the disk, and deserializing and decompressing the read portion from the disk.

9. A distributed processing system, including:

a plurality of compute nodes, wherein each of the plurality of compute nodes comprises at least one processor; and a plurality of storage structures, the plurality of storage structures having computer executable instructions which, when executed by at least one processor of the one or more compute nodes, cause the at least one processor to:

implement at least one key/value store across multiple ones of the plurality of storage structures;

implement a workflow in the form of one or more flowlets instantiated on the at least a subset of the plurality of compute nodes; and connect the at least one key/value store to the one or more flowlets in a directed acyclic graph such that the connection indicates whether a particular flowlet of the one or more flowlets reads from, or reads from ad writes to, the at least one key/value store, wherein each of the one or more flowlets comprises one or more user defined functions, wherein dependencies are inferred and barriers are defined based on the directed acyclic graph, wherein the barriers allow a developer to access the at least one key/value store from within flowlet code;

wherein the at least one key/value store are read-accessible, write-accessible, or read/write-accessible to at least one of the plurality of compute nodes; wherein depending on an amount of memory available for the at least one key/value store, the distributed processing system is configured to perform at least one of the following functions:

(a) storing all keys and/or values as objects,
(b) serializing and storing at least a portion of the keys and/or values in an array to reduce object overhead,
(c) compressing at least a portion of serialized keys and/or values, and storing at least a portion of serialized and compressed keys and/or values to a disk, reading said at least a portion of serialized and compressed portions of the keys and/or values from the disk, and deserializing and decompressing the read portion from the disk.

10. The system of claim 9, wherein at least one of the at least one key/value store is caused, by the at least one processor, to store data using key/value pairs, wherein a key maps to a particular storage structure, and a value represents data.

11. The system of claim 10, wherein data is duplicated, and wherein a key maps to one or more standby storage structures, a key/value pair being duplicated across one or more storage structures.

12. The system of claim 9, wherein one or more of the storage structures are caused, by the at least one processor, to store historical versions of at least one of the at least one key/value store.

13. The system of claim 9, wherein at least a subset of the plurality of compute nodes are caused, by the at least one processor, to iteratively access and modify at least one of the at least one key/value store.

14. The system of claim 9, wherein at least one of the flowlets is caused, by the at least one processor, to access at least one of the at least one key/value store.

\* \* \* \* \*